US011553378B2

(12) United States Patent
Hua et al.

(10) Patent No.: US 11,553,378 B2
(45) Date of Patent: Jan. 10, 2023

(54) NETWORK SLICING WITH MULTIPLE SLICE INSTANCE VARIATION TYPES

(71) Applicant: Verizon Patent and Licensing Inc., Basking Ridge, NJ (US)

(72) Inventors: Suzann Hua, Beverly Hills, CA (US); Lalit R. Kotecha, San Ramon, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/242,424

(22) Filed: Apr. 28, 2021

(65) Prior Publication Data
US 2022/0353745 A1   Nov. 3, 2022

(51) Int. Cl.
*H04W 28/24* (2009.01)
*H04W 48/18* (2009.01)
*H04W 28/02* (2009.01)
*H04W 76/11* (2018.01)

(52) U.S. Cl.
CPC ....... *H04W 28/24* (2013.01); *H04W 28/0284* (2013.01); *H04W 48/18* (2013.01); *H04W 76/11* (2018.02)

(58) Field of Classification Search
CPC .. H04W 28/0284; H04W 48/18; H04W 76/11
See application file for complete search history.

(56) References Cited

U.S. PATENT DOCUMENTS

| 11,310,733 | B1* | 4/2022 | Gupta | H04W 4/60 |
| 2021/0306938 | A1* | 9/2021 | Seetharaman | H04W 16/14 |
| 2021/0352534 | A1* | 11/2021 | Tiwari | H04W 28/24 |
| 2021/0392501 | A1* | 12/2021 | Buyukdura | H04W 16/02 |

* cited by examiner

*Primary Examiner* — Marcus Smith (57) ABSTRACT

One or more network devices create, in a network, a network slice with multiple network slice instances (NSIs) having multiple slice instance variations, where each of the multiple slice instance variations services a slice variation type and one of multiple slice variation levels. The slice variation type corresponds to a first performance characteristic of one or more performance characteristics met by the network slice while servicing sessions and the multiple slice variation levels sub-divide the slice variation type into multiple different levels of service within the slice variation type. The one or more network devices allocate, instantiate, and provision virtual resources for each of the multiple NSIs; and services User Equipment (UE) sessions via one of the multiple slice instance variations based on UE selection of one of the multiple slice variation levels of the slice variation type.

20 Claims, 10 Drawing Sheets

NETWORK SLICING WITH MULTIPLE SLICE INSTANCE VARIATION TYPES

BACKGROUND

Next Generation mobile networks, such as Fifth Generation New Radio (5G NR) mobile networks, may operate in various frequency ranges, including higher frequency ranges (e.g., in the gigahertz (GHz) frequency band), and may have a broad bandwidth (e.g., near 500-1,000 megahertz (MHz)). The bandwidth of Next Generation mobile networks supports higher speed downloads. The 5G mobile telecommunications standard supports more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless networks, permitting a greater density of wireless users. Next Generation mobile networks are designed to increase data transfer rates, increase spectral efficiency, improve coverage, improve capacity, and reduce latency.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

"Network Slicing" is an innovation for implementation in Next Generation Mobile Networks. Network slicing is a type of virtualized networking architecture that involves partitioning of a single physical network into multiple virtual networks that may be composed of various Virtual Network Functions (VNFs). VNFs include network functions that have been moved out of dedicated hardware devices into software that runs on commodity hardware. VNFs may be executed as one or more Virtual Machines (VMs) on top of the hardware networking infrastructure. Examples of various VNFs include switches, routers, servers, tunneling gateway elements, traffic analysis functions, mobile network nodes (e.g., User Plane Function (UPF), Session Management Function (SMF), Access and Mobility Management Function (AMF), Unified Data Management (UDM) function, Policy Control Function (PCF)), and security functions (e.g., firewalls, intrusion detection systems, virus scanners, and spam protection). The partitions, or "slices," of a virtualized network, including each slice's VNFs, may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements of the objective of the particular network slice. Network slicing may be implemented in a dynamic fashion, such that the slices of the virtualized network may change over time and may be re-customized to meet new or changing needs of applications, services, devices, customers, or operators.

VNFs are components of an overall Network Functions Virtualization (NFV) architecture that may be employed within network slices. NFV is a part of an initiative, as networks move to a Software Defined Network (SDN) model, to virtualize network services traditionally run on proprietary, dedicated hardware. NFV virtualizes classes of VNFs into building blocks that may be connected, or chained together, to create network services. With NFV, VNFs are packaged as Virtual Machines (VMs) on commodity hardware, instead of traditional network services being executed by proprietary, dedicated hardware. A NFV architecture typically includes a NFV infrastructure (NFVI) and a network functions virtualization management and orchestration architectural framework (NFV-MANO). NFVI includes the hardware and software components that build the environment where VNFs are deployed. The NFVI can span several different locations, with connectivity between the locations. The NFV-MANO includes a collection of functional blocks, data repositories, and interfaces through which the functional blocks of the NFV-MANO exchange information to manage and orchestrate the NFVI and VNFs. Network slicing, through the use of NFV and SDNs, enables Next Generation mobile networks (e.g., Fifth Generation (5G) mobile networks) to offer a variety of services, which may be altered in a dynamic fashion, that demand different network performances for different types of sessions.

A network slice, when created in a mobile network, is typically designed to satisfy one or more performance characteristics or performance requirements for data sessions that are serviced by the network slice. In some circumstances, however, it may be desirable to sub-divide a given network slice such that it continues to satisfy or meet the one or more performance characteristics/performance requirements associated with the purpose of the network slice but allows further differentiation among the levels of service, and corresponding performance characteristics, that may apply to the data sessions. As described herein, a given network slice may be subdivided into multiple slice instance variations, with each slice instance variation having a slice variation type and one of multiple slice variation levels within the slice variation type. For example, each slice instance variation may have one of the following slice variation types: load, latency, consistency, reliability, server locations, network connectivities, dynamic Service Level Agreements (SLAs), and availability. The multiple slice variation levels of each slice variation type sub-divide the parameter or performance characteristic of the slice variation type into multiple different levels of the parameter or performance characteristic. As one example, a slice variation instance having a slice variation type of "load" may be sub-divided into "high load," "medium load," and "low load" slice variation levels. As described further herein, a Slice Manager and Orchestrator may create multiple Network Slice Instances (NSIs) within a given network slice, with each of the created NSIs including a slice instance variation that services a particular slice variation type and a particular slice variation level within that slice variation type.

Figure 1:
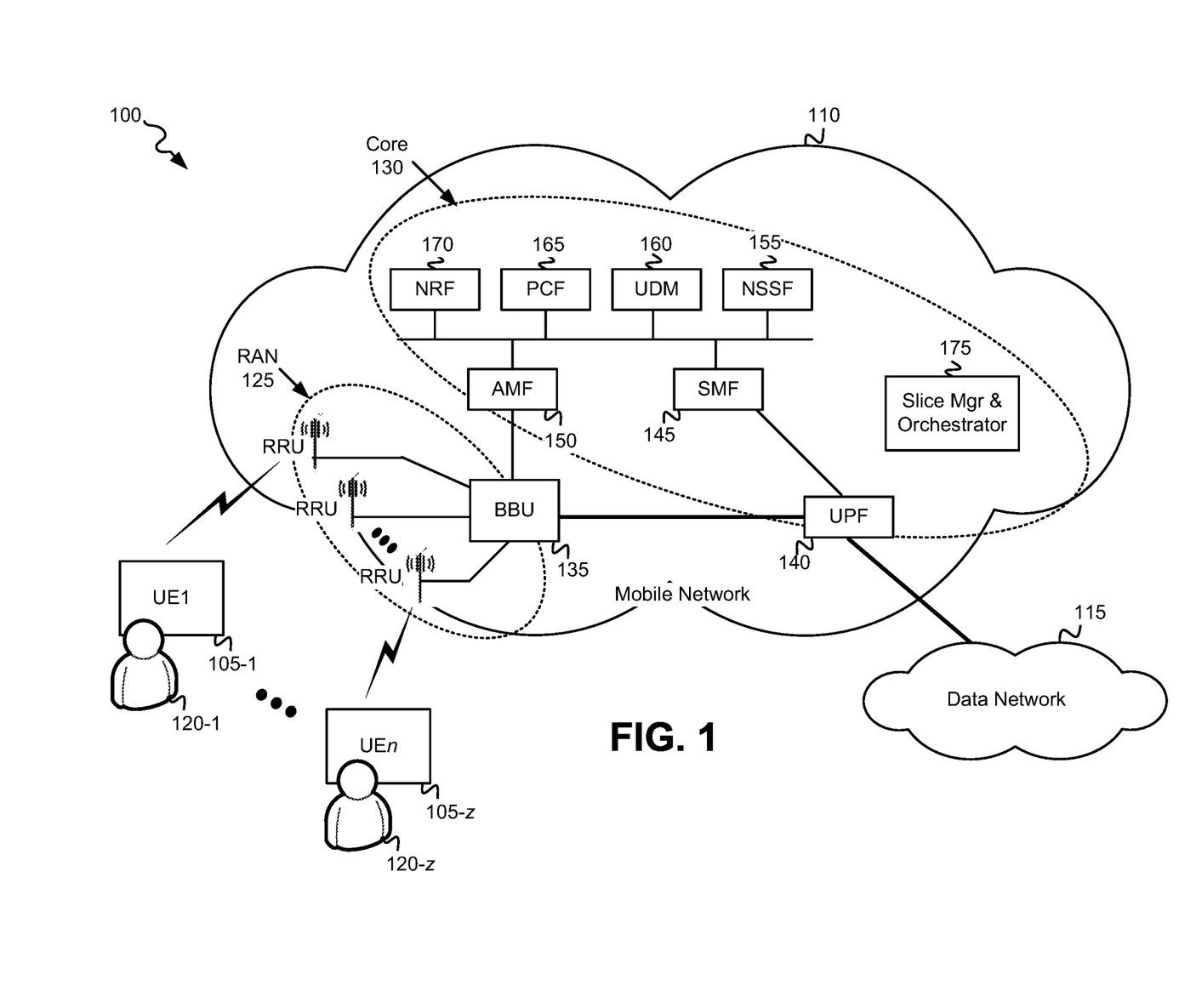
FIG. 1 depicts an example of a network environment in which network slicing, including sub-slicing of a network slice into slice instance variations having different slice variation levels, may be implemented.

FIG. 1 depicts an example of a network environment 100 in which network slicing, including sub-dividing a network slice into slice variation instances having different slice variation levels, may be implemented as described further herein. As shown, network environment 100 may include User Equipment devices 105-1 through 105-z (generically referred to herein as a "UE 105" or "UEs 105"), a network 110, and a data network(s) 115.

UEs 105-1 through 105-z may each include any type of device having a communication capability, such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 120-1 is shown in association with UE 105-1 and a user 120-z is shown in association with UE 105-z.

Network 110 may include a Public Land Mobile Network (PLMN) (referred to herein as a "mobile network 110" or a "network 110") and possibly one or more other networks (not shown). Mobile network 110 may include other networks, such as a Radio Access Network (RAN) 125 and a core network 130. RAN 125 may include various types of radio access equipment that implement Radio Frequency (RF) communication with UEs 105. The radio access equipment of RAN 125 may include, for example, multiple Remote Radio Units (RRUs) and at least one baseband unit (BBU) 135 (only a single BBU 135 is shown in FIG. 1, however, RAN 125 may include multiple BBUs). Each of the RRUs includes devices that operate as a radio function unit which transmit and receive RF signals to/from UEs 105. BBU 135 interconnects with the distributed RRUs of RAN 125 via fronthaul links or a fronthaul network. RAN 125 may additionally include other nodes, functions, and/or components not shown in FIG. 1.

Core network 130 includes devices or nodes that perform NFs that operate the mobile network 110 including, among other NFs, mobile network access management, session management, and policy control NFs. In the example network environment 100 of FIG. 1, core network 130 is shown as including a 5G mobile network that further includes 5G Network Functions (NFs), such as a User Plane Function (UPF) 140, a Session Management Function (SMF) 145, an Access and Mobility Management Function (AMF) 150, a Network Slice Selection Function (NSSF) 155, a Unified Data Management (UDM) function 160, a Policy Control Function (PCF) 165, a Network Repository Function (NRF) 170, and a Slice Manager and Orchestrator 175. UPF 140, SMF 145, AMF 150, NSSF 155, UDM 160, PCF 160, and NRF 170 may be implemented as VNFs within mobile network 110.

UPF 140 may act as a router and a gateway between mobile network 110 and a data network 115, and forwards session data between data network 115 and RAN 125. Though only a single UPF 140 is shown in FIG. 1, mobile network 110 may include multiple UPFs 140 at various locations in network 110. SMF 145 performs session management, allocates network addresses to UEs 105, and selects and controls UPFs 140 for data transfer. AMF 150 performs authentication, authorization, and mobility management for UEs 105. NSSF 155 selects a set of network slice instances that may serve a UE 105, and determines the allowed single Network Slice Selection Assistance Information (S-NSSAI) for a UE 105. UDM 160 manages data for user access authorization, user registration, and data network profiles. UDM 160 may include, or operate in conjunction with, a User Data Repository (UDR—not shown) which stores user data, such as customer profile information, customer authentication information, and encryption keys. PCF 165 implements policy and charging control for service data flows and Protocol Data Unit (PDU) session related policy control.

NRF 170 operates as a centralized repository of information regarding NFs in mobile network 110. NRF 170 enables NFs (e.g., UPF 140, SMF 145, AMF 150, UDM 160) to register and discover each other via an Application Programming interface (API). NRF 170 maintains an updated repository of information about the NFs available in mobile network 110, along with information about the services provided by each of the NFs. NRF 170 further enables the NFs to obtain updated status information of other NFs in mobile network 110. NRF 170 may, for example, maintain profiles of available NF instances and their supported services, allow NF instances to discover other NF instances in mobile network 110, and allow NF instances to track the status of other NF instances.

Slice Manager & Orchestrator 175, described in further detail below, performs, among other operations and functions, network slice and network slice instance (NSI) creation, virtual network resource allocation, instantiation, and provisioning, and network slice, slice instance variation, and NSI monitoring, reporting, and life cycle management (LCM).

Data network 115 may include one or more interconnected networks, such as local area networks (LANs), wide area networks (WANs), metropolitan area networks (MANs), and/or the Internet. Data network 115 may connect with UPFs 140 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 130 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G network. Additionally, though only a single one of each of the NFs UPF 140, SMF 145, AMF 150, NSSF 155, UDM 160, PCF 165, and NRF 170 is shown in FIG. 1, mobile network 110 may include multiple instances of each of these NFs. For example, each network slice and/or slice instance variation (described further below) may include its own SMF 145, PCF 165, and UPF 140.

Figure 2:
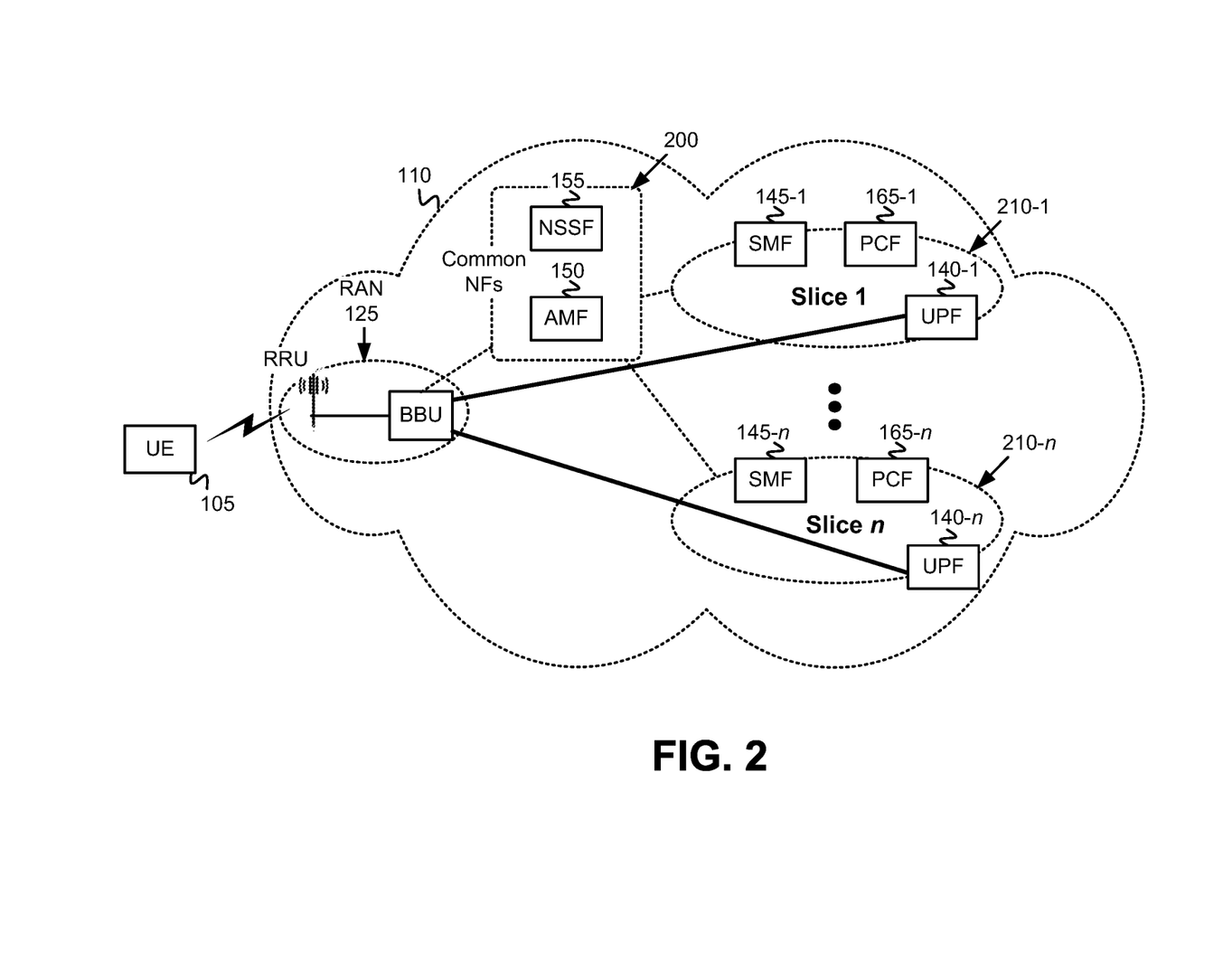
FIG. 2 depicts an example of the division of a mobile network into multiple network slices.

FIG. 2 depicts an example of the division of the mobile network 110 into multiple (n) network slices. Each network slice of network slices 210-1 through 210-n may include a logical end-to-end network, which may run on a shared physical infrastructure, that is created to serve a particular purpose and/or service data traffic with a particular set of performance parameters or characteristics. For example, each network slice of network slices 210-1 through 210-n may service a particular service type and/or may satisfy or meet particular performance characteristics or parameters for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (MIoT) SST. Each network slice may, however, have a different SST not described herein.

As shown in FIG. 2, a group of common NFs 200 of mobile network 110 may service the various different network slices 210-1 through 210-n (where n is greater than or equal to two) and, therefore, may not be considered to be included within the network slices 210-1 through 210-n. In the example shown, the common NFs 200 of mobile network 110 include an AMF 150 and a NSSF 155.

Each network slice may include its own dedicated set of NFs, where each NF operates to service UE sessions handled by that particular network slice. For example, as shown in FIG. 2, network slice 210-1 includes SMF 145-1, PCF 165-1, and UPF 140-1 that operate to exclusively service UE sessions within network slice 210-1. As a further example, network slice 210-n includes SMF 145-n, PCF 165-n, and UPF 140-n that operate to exclusively service UE sessions within network slice 210-n.

Figure 3:
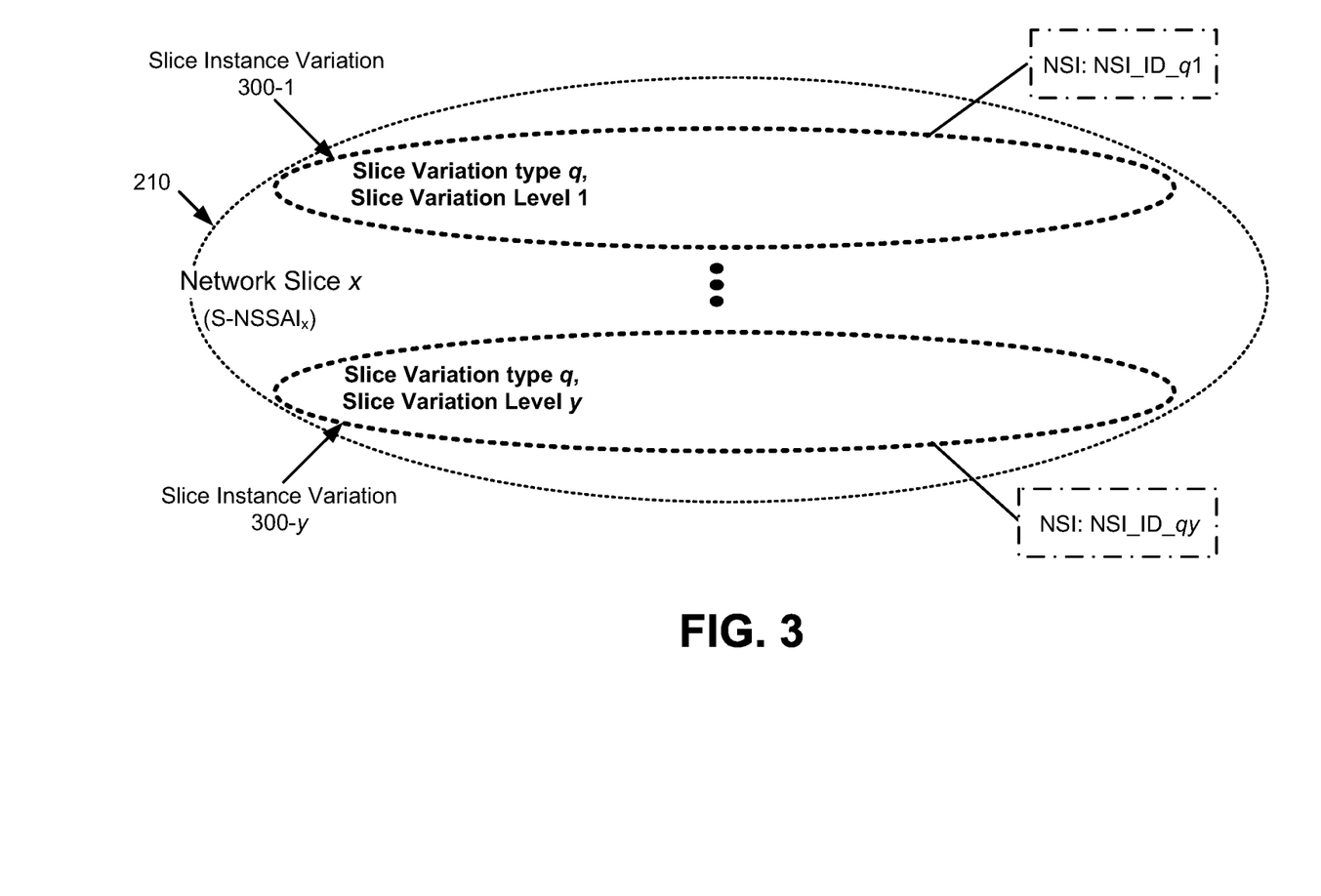
FIG. 3 depicts an example of division of a network slice into multiple slice instance variations, with each slice instance variation being associated with a particular slice variation type and a particular slice variation level within the slice variation type.

FIG. 3 depicts an example of a further division of a network slice x into multiple slice instance variations 300-1 through 300-y, with each slice instance variation being associated with a particular slice variation type and a particular slice variation level, of multiple slice variation levels within that slice variation type. Each slice instance variation 300 is served by its own Network Slice Instance (NSI). A "network slice instance" (NSI), as referred to herein, is a set of NF instances and the resources (e.g., compute, storage, and networking resources) required to form a deployed network slice instance. Thus, network slice 210 may include multiple NSIs, with each NSI serving a slice instance variation that is associated with a particular slice variation type and one of multiple slice variation levels within the slice variation type. Each slice instance variation 300, and its corresponding NSI, may serve the overall purpose and/or performance requirements of the network slice 210 but offer different variations in service within the constraints of the network slice 210. As described further herein, each NSI may be assigned its own unique NSI identifier (ID) that serves as an identifier for the slice instance variation (e.g., slice variation type and slice variation level) associated with the NSI.

A slice variation type associated with a slice instance variation 300 may identify a service parameter or service performance characteristic that can vary within the overall constraints of the network slice 210. For example, each slice instance variation 300 may have one of the following slice variation types: 1) load, 2) latency, 3) consistency, 4) reliability, 5) server locations, 6) network connectivity, 7) dynamic service level agreements (SLAs), or 8) availability. The service parameter or service performance characteristic of each slice variation type further may have multiple "levels" or "categories" that are referred to herein as "slice variation levels." For example, a network slice 210 may have three slice instance variations 300, each having a slice variation type=load, and a slice variation level=high load, medium load, or low load. As another example, a network slice 210 may have three slice instance variations 300, each having a slice variation type=network connectivity and a slice variation level=Multi-Access Edge Computing (MEC) network connectivity, Service Access Point (SAP) network connectivity, or Core network connectivity. As a further example, a network slice 210 may have four slice instance variations 300, each having a slice variation type=dynamic SLAs, and a slice variation level=one of multiple differentiated SLAs (e.g., SLA_1, SLA_2, SLA_3, SLA_4) that all satisfy the overall minimum SLA of the network slice 210.

Network slice 210 may be assigned a S-NSSAI value that uniquely identifies the network slice. The S-NSSAI value may include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs within the network slice, may be used within mobile network 110 for network slice and slice instance variation/NSI selection for servicing UE sessions.

Figure 4:
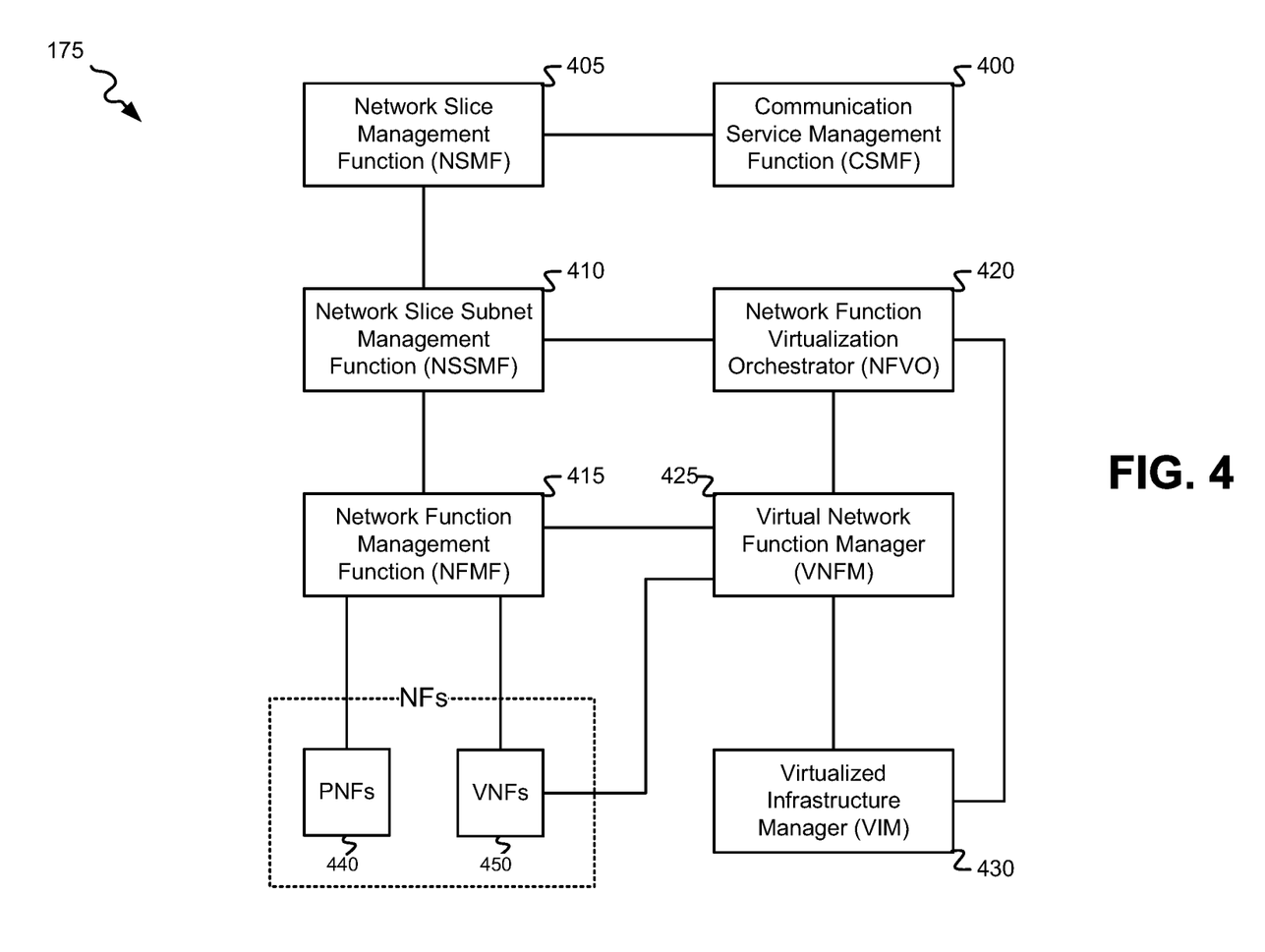
FIG. 4 illustrates exemplary components of a Slice Manager and Orchestrator.

FIG. 4 illustrates exemplary components of the Slice Manager & Orchestrator 175 of FIG. 1. Slice Manager & Orchestrator 175 may include, among other functions, a Communication Service Management Function (CSMF) 400, a Network Slice Management Function (NSMF) 405, a Network Slice Subnet Management Function (NSSMF) 410, a Network Function Virtualization Orchestrator (NFVO) 420, a Network Function Management Function (NFMF) 415, a Virtual Network Function Manager (VNFM) 425, a Virtualized Infrastructure Manager (VIM) 430, and Network Functions (NFs) 440 and 450. The functions of Slice Manager & Orchestrator 175 may be executed by a single network device or may be executed by multiple network devices interconnected via a network and/or one or more links.

CSMF 400 includes NFs that provision and manage communication service instances within mobile network 110. CSMF 400 requests necessary resources to implement the communication service instances and carries out service assurance and SLA enforcement for each service instance in active operation.

NSMF 405 includes NFs that perform NSI monitoring, reporting, and life cycle management. NSMF 405, for example, performs slice level/NSI health monitoring, SLA assurance, and slice/NSI life cycle management. NSSMF 410 performs network slice subnet instance (NSSI) monitoring, reporting, and life cycle management. NSSMF 410, for example, performs alarm correlation and statistics aggregation at the slice subnet level, and NSSI life cycle management and provisioning according to the slice profile.

NFVO 420 includes NFs that perform resource and network service orchestration within mobile network 110. For resource orchestration, NFVO 420 oversees the allocation of resources and monitors the allocated resources. The resources may include compute resources (e.g., VNFs 450), storage resources, and network resources. The network resources may include ports, subnets, forwarding rules, etc. needed for inter-VNF communications. For network service orchestration, NFVO 420 manages VNF deployment, creates and terminates links/networks between VNFs, increases/decreases network service capacity, updates VNF forwarding information, and instantiates VNFs in coordination with VNFM 425.

NFMF 415 includes NFs that perform NF monitoring, reporting, and configuring. NFMF 415, for example, performs NF parameter configuration and provisioning. VNFM 425 includes NFs that perform life cycle management of VNFs, including VNF instantiation, scaling of VNFs, updating/upgrading of VNFs, and termination of VNFs. NFVO 420 coordinates with VNFM 425 to instantiate VNFs and manage the deployment of network services that are made up of VNFs. VNFM 425 further performs key performance indicator (KPI) monitoring. VIM 430 includes NFs that control and manage the NFV infrastructure (NFVI) compute resources, storage resources, and network resources in coordination with NFVO 420 and VNFM 425. NFs 440 and 450 may include Physical NFs (PNFs) 440 and VNFs 450. PNFs 440 include physical network nodes which have not undergone virtualization. Both PNFs 440 and VNFs 450 can be used to implement an overall network service.

The configuration of the components of Slice Manager & Orchestrator 175 of FIG. 4 is for illustrative purposes. Other configurations may be implemented. Therefore, Slice Manager & Orchestrator 175 may include additional, fewer and/or different components, arranged in a different configuration, than depicted in FIG. 4.

Figure 5:
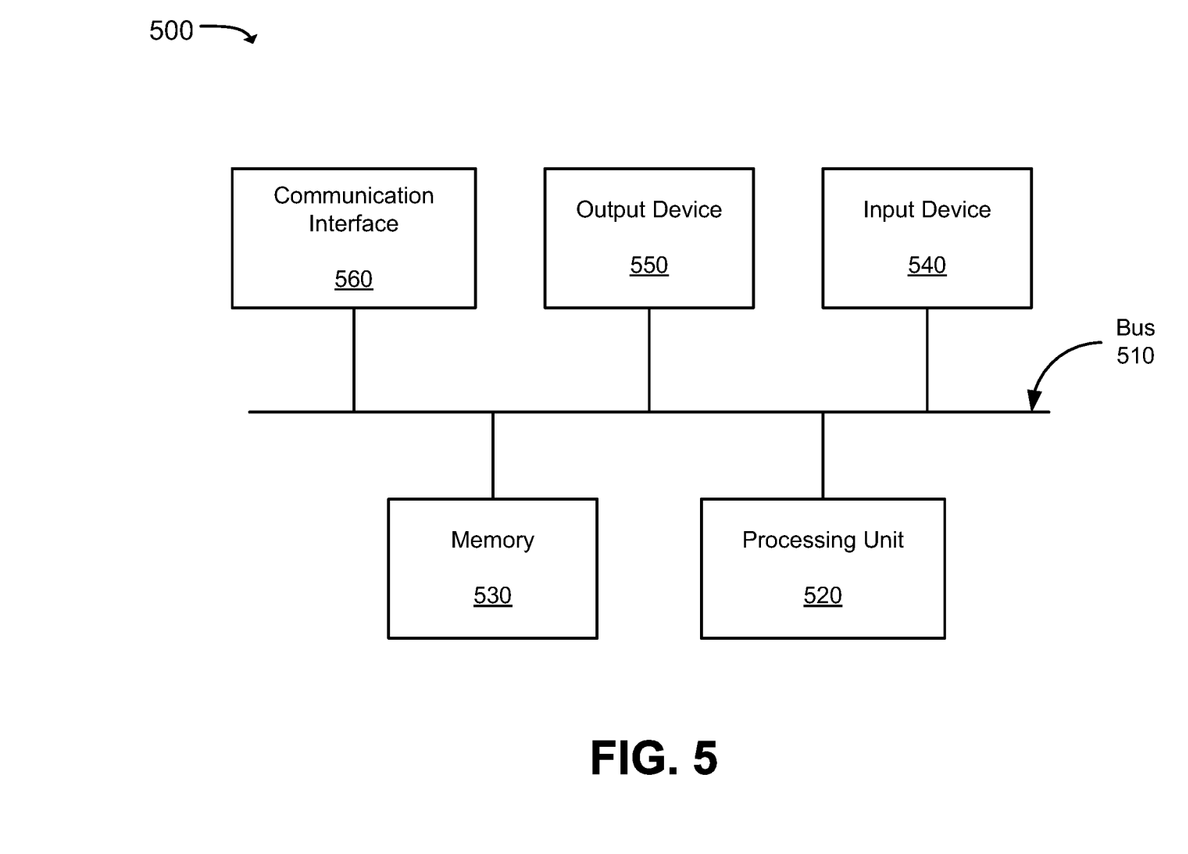
FIG. 5 is a diagram that depicts exemplary components of a network device that may execute various network functions described herein.

FIG. 5 is a diagram that depicts exemplary components of a network device 500 (referred to herein as a "network device" or a "device"). UEs 105, the RRUs of RAN 125, BBU 135, and Slice Manager & Orchestrator 175 may include components that are the same as, or similar to, those of device 500 shown in FIG. 5. Furthermore, each of the network functions UPF 140, SMF 145, AMF 150, NSSF 155, UDM 160, PCF 165, and NRF 170 may be implemented by a network device that includes components that are the same as, or similar to, those of device 500. Some of the NFs UPF 140, SMF 145, AMF 150, NSSF 155, UDM 160, PCF 165, and NRF 170 may be implemented by a same device 500 within mobile network 110, while others of the functions may be implemented by one or more separate devices 500 within mobile network 110.

Device 500 may include a bus 510, a processing unit 520, a memory 530, an input device 540, an output device 550, and a communication interface 560. Bus 510 may include a path that permits communication among the components of device 500. Processing unit 520 may include one or more processors or microprocessors which may interpret and execute instructions, or processing logic. Memory 530 may include one or more memory devices for storing data and instructions. Memory 530 may include a random access memory (RAM) or another type of dynamic storage device that may store information and instructions for execution by processing unit 520, a Read Only Memory (ROM) device or another type of static storage device that may store static information and instructions for use by processing unit 520, and/or a magnetic, optical, or flash memory recording and storage medium. The memory devices of memory 530 may each be referred to herein as a "tangible non-transitory computer-readable medium," "non-transitory computer-readable medium," or "non-transitory storage medium." In some implementations, the processes/methods set forth herein can be implemented as instructions that are stored in memory 530 for execution by processing unit 520.

Input device 540 may include one or more mechanisms that permit an operator to input information into device 500, such as, for example, a keypad or a keyboard, a display with a touch sensitive panel, voice recognition and/or biometric mechanisms, etc. Output device 550 may include one or more mechanisms that output information to the operator, including a display, a speaker, etc. Input device 540 and output device 550 may, in some implementations, be implemented as a user interface (UI) that displays UI information and which receives user input via the UI. Communication interface 560 may include a transceiver(s) that enables device 500 to communicate with other devices and/or systems. For example, communication interface 560 may include one or more wired and/or wireless transceivers for communicating via mobile network 110 and/or data network 115. In the case of RRUs of RAN 125, communication interface 560 may further include one or more antenna arrays for producing radio frequency (RF) cell sectors.

The configuration of components of network device 500 illustrated in FIG. 5 is for illustrative purposes. Other configurations may be implemented. Therefore, network device 500 may include additional, fewer and/or different components, that may be arranged in a different configuration, than depicted in FIG. 5.

Figure 6:
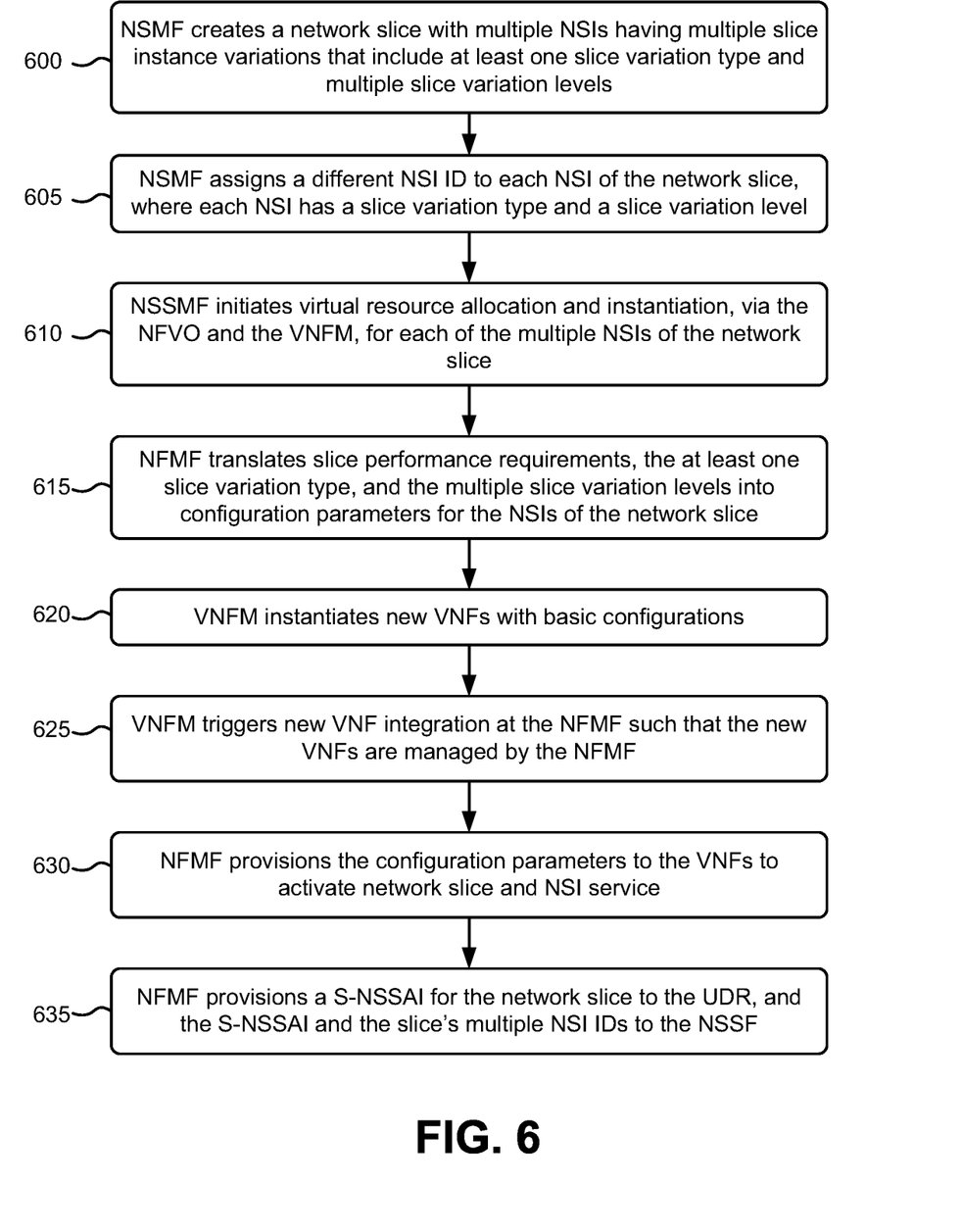
FIG. 6 is a flow diagram of an exemplary process for creating, managing, and orchestrating, within a network, network slices with multiple slice instance variations having at least one slice variation type and multiple slice variation levels.

FIG. 6 is a flow diagram of an exemplary process for creating, managing, and orchestrating, within network 110, network slices with multiple slice instance variations having at least one slice variation type and multiple slice variation levels. The exemplary process of FIG. 6 may be implemented by Slice Manager & Orchestrator 175. The exemplary process of FIG. 6 is described with additional reference to FIG. 4.

The exemplary process includes NSMF 405 of Slice Manager & Orchestrator 175 creating a network slice with multiple NSIs having multiple slice instance variations that include at least one slice variation type and multiple slice variation levels (block 600). Each network slice corresponds to a particular purpose and/or particular performance requirements and each NSI includes a slice instance variation having a particular slice variation type and one of multiple slice variation levels associated with the particular slice variation type. For example, a particular network slice may have three slice instance variations, each having a slice variation type=load, and a slice variation level=high load, medium load, or low load. In this example, the network slice may be created with three different NSIs, with the first NSI having a slice variation type=load and slice variation level=high load, the second NSI having a slice variation type=load and slice variation level=medium load, and the third NSI having a slice variation type=load and slice variation level=low load.

Creation of each NSI of a network slice includes instantiating, allocating, provisioning, and/or configuring a set of NF instances, and required resources (e.g., compute, storage, and networking resources), for serving the overall purpose and/or performance requirements of the network slice and for serving the slice variation type and slice variation level of the particular slice instance variation. NSMF 405 designs and creates a network slice that consists of multiple slice instance variations, with each of the slice instance variations having a slice variation type and one of the multiple different slice variation levels. For example, in a network slice either having no requirement with respect to latency, or which is designed to meet a high latency performance requirement, the multiple different slice variation levels corresponding to the slice instance variations of the network slice may include a high latency, a medium latency, and a low latency. Therefore, the network slice may be divided into a slice instance variation #1 (NSI #1) having a high latency, a slice instance variation #2 (NSI #2) having a medium latency, and a slice instance variation #3 (NSI #3) having a low latency.

NSMF 405 further assigns a different NSI ID to each NSI of the network slice, where each NSI has a slice variation type and a slice variation level (block 605). Each of the multiple NSIs created within the network slice is assigned its own unique NSI ID such that each slice instance variation, having a particular slice variation type and slice variation level, is associated with a unique NSI ID. As an example, referring back to the network slice x 210 of FIG. 3, slice instance variation 300-1, having a slice variation type q and slice variation level 1, may be assigned the NSI ID "NSI_ID_q1". Slice instance variation 300-y, having a slice variation type q and slice variation level y, may be assigned the NSI ID "NSI ID qy."

NSSMF 410 of Slice Manager & Orchestrator 175 initiates virtual resource allocation and instantiation, via the NFVO 420 and the VNFM 425, for each of the multiple NSIs of the network slice (block 610). NSSMF 410 works in coordination with NFVO 420 and VNFM 425 to allocate and instantiate the virtual resources for each slice, each NSI/slice instance variation within each network slice for servicing sessions within the requirements of the network slice and each slice instance variation's slice variation type and slice variation level. NFMF 415 of Slice Manager & Orchestrator 175 translates slice performance requirements/ parameters, the at least one slice variation type, and the multiple slice variation levels into configuration parameters for configuring virtual network resources of the NSIs of the network slice (block 615). NFMF 415 determines, based on the allocated and instantiated virtual resources for each slice instance variation/NSI, the configuration parameters for the virtual resources (e.g., compute, storage, and networking resources) of each of the slice instance variations that will assist in enabling the NSIs to satisfy the slice performance requirements (e.g., SLAs), the at least one slice variation type, and the multiple slice variation levels when servicing UE sessions.

VNFM 425 of Slice Manager & Orchestrator 175 instantiates new VNFs with basic configurations (block 620) and triggers new VNF integration at the NFMF 415 such that the new VNFs are managed by the NFMF 415 (block 625). VNFM 425 determines what additional new VNFs need to be instantiated within each slice instance variation to assist in satisfying the slice performance requirements and the slice instance variation levels, and then instantiates the new VNFs, within the virtual resources, with basic configurations that can be provisioned, as described further below, with the configuration parameters determined in block 615.

NFMF 415 provisions the configuration parameters of block 615 to the VNFs to activate network slice and NSI service (block 630), and further provisions a S-NSSAI for the network slice to the UDR, and the S-NSSAI and the network slice's multiple NSI IDs to the NSSF 155 (block 635). NFMF 415 assigns the network slice a S-NSSAI value that uniquely identifies the network slice and obtains the NSI IDs assigned (in block 605) to the multiple NSIs of the network slice. As described above, the S-NSSAI value may include a SST value and a SD value.

Figure 7A:
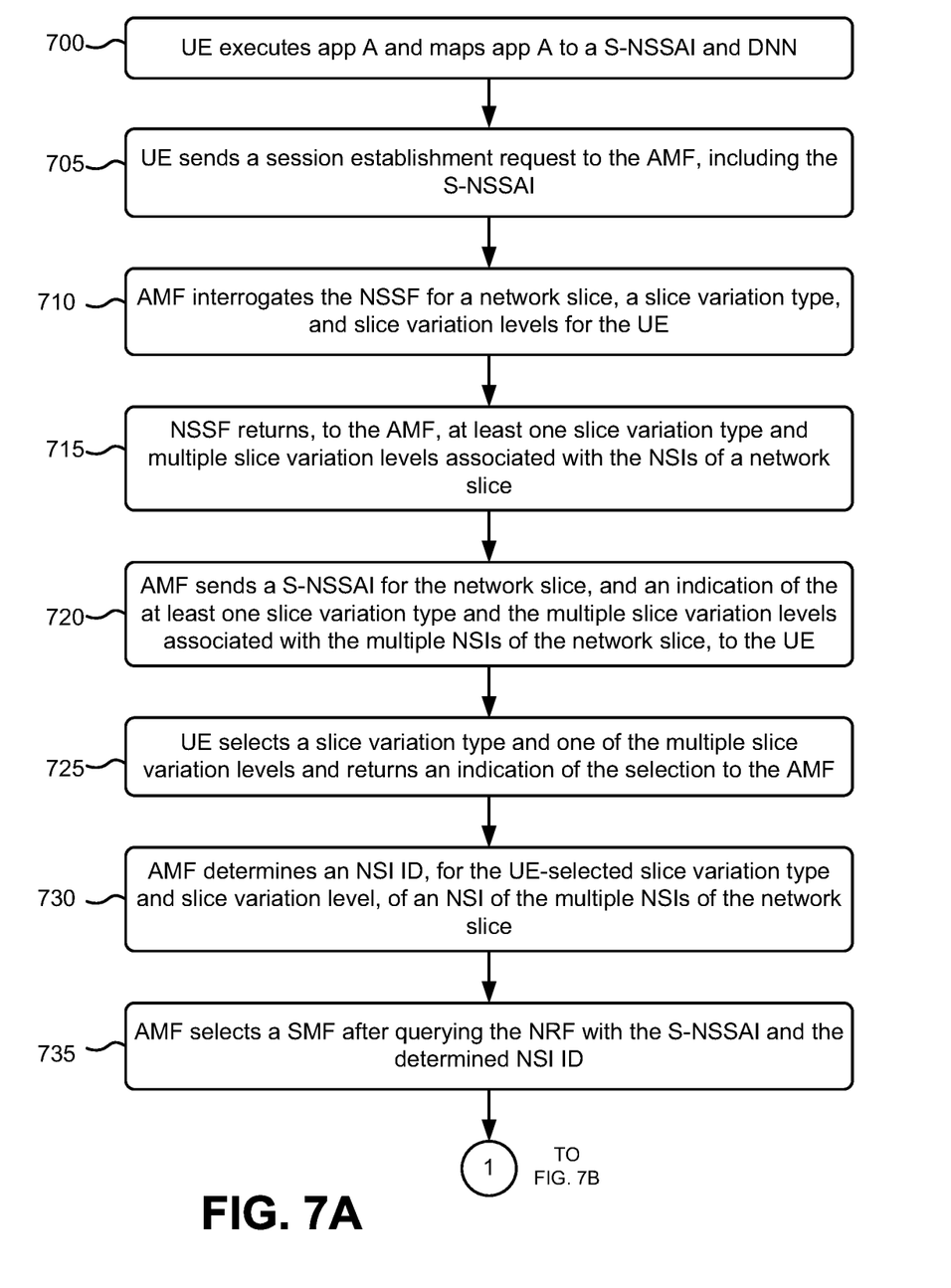
FIGS. 7A and 7B are flow diagrams of an exemplary process for establishing a data session via a network slice and a slice instance variation having a slice variation type and slice variation level.
Figure 7B:
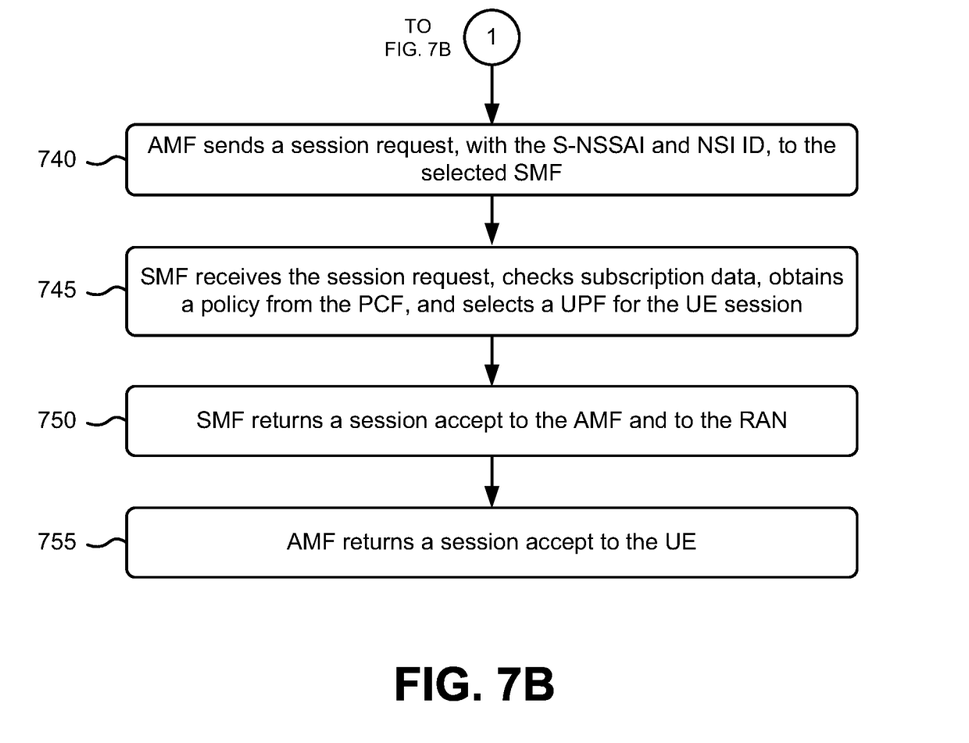
Figure 8A:
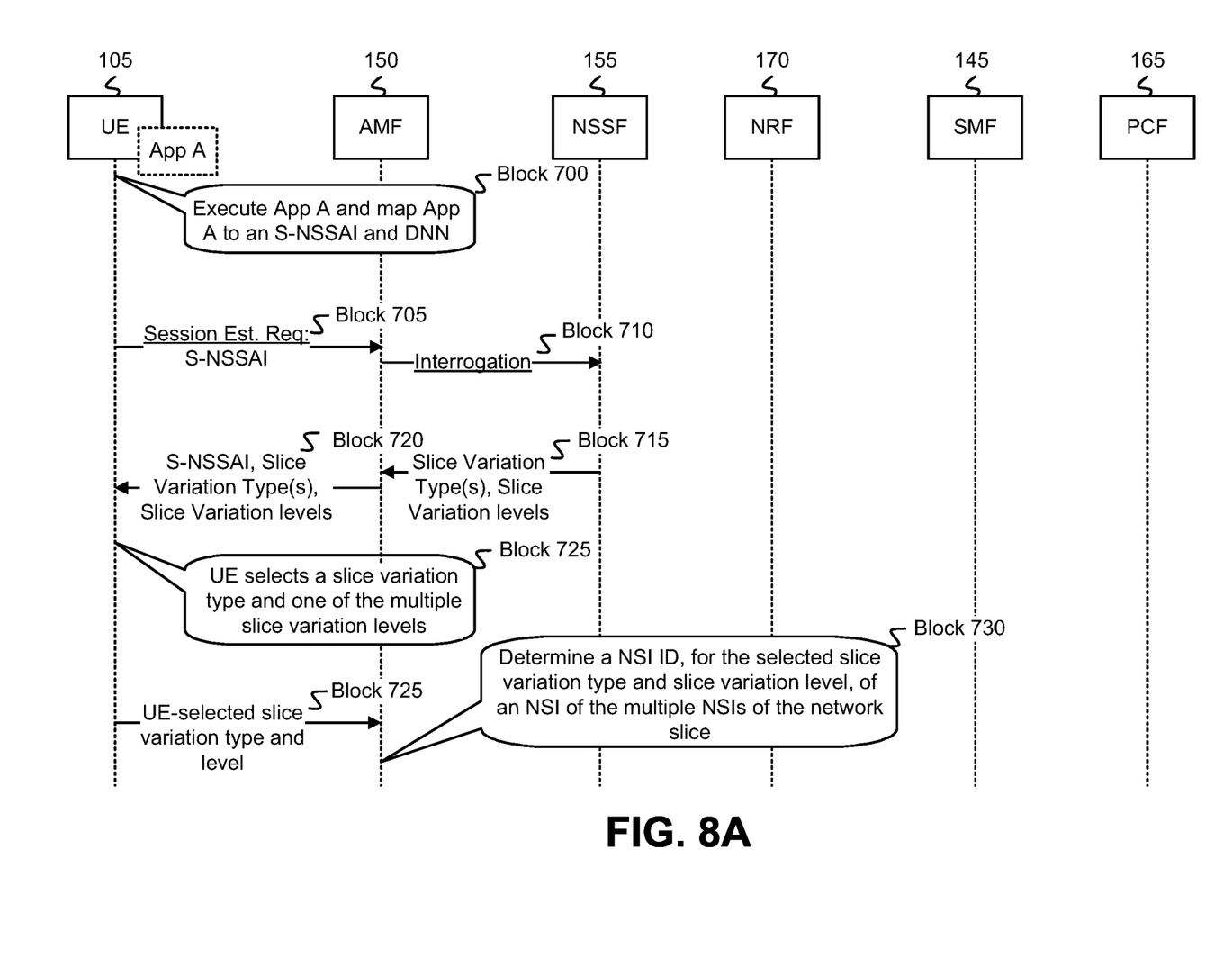
FIGS. 8A and 8B depict exemplary operations, messages, and data flows associated with an exemplary process.
Figure 8B:
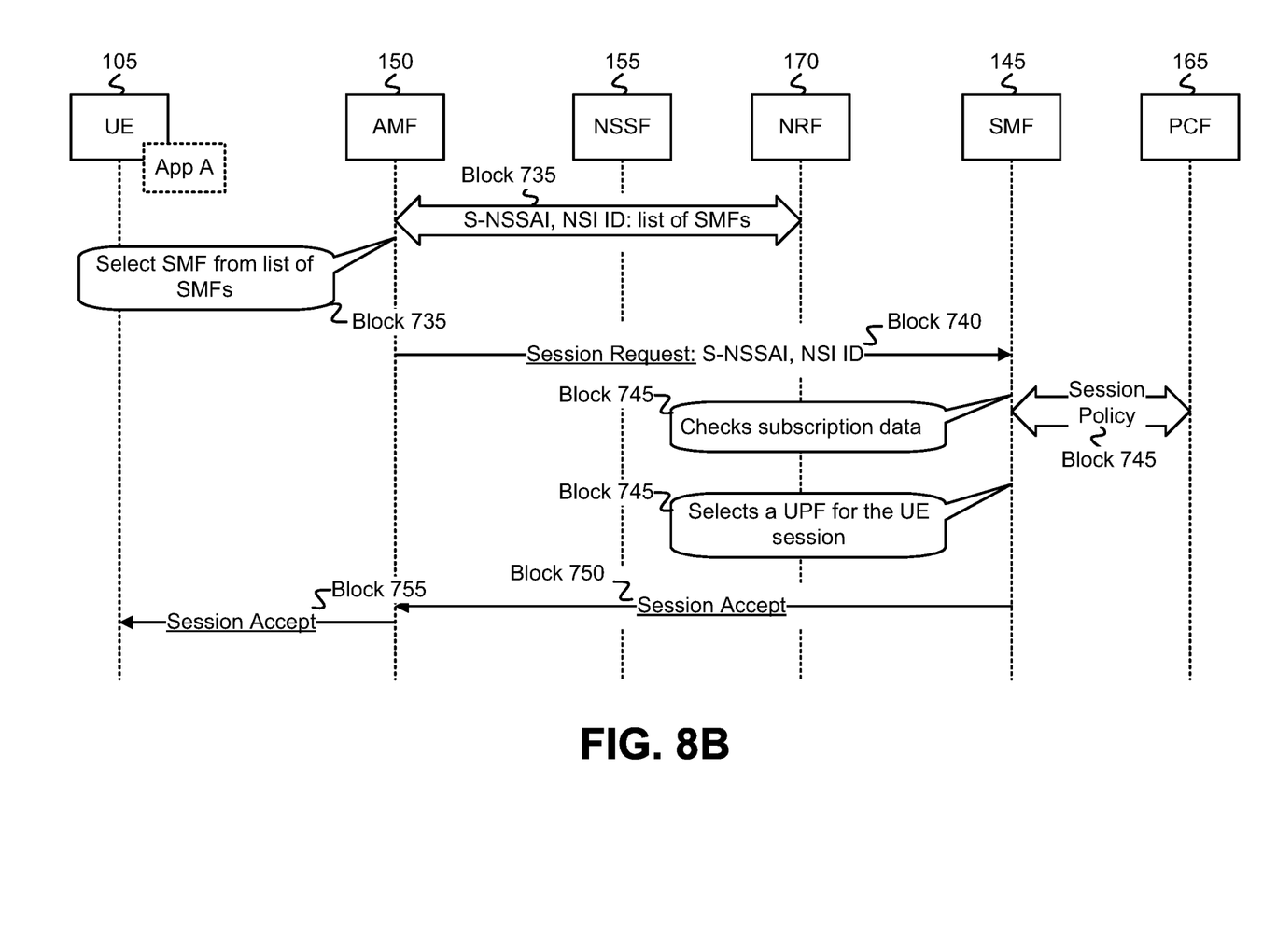

FIGS. 7A and 7B are flow diagrams of an exemplary process for establishing a data session via a network slice and a slice instance variation having a slice variation type and a slice variation level. The exemplary process of FIGS. 7A and 7B may be implemented by RAN 125, BBU 135, and NFs of the core network 130 of mobile network 110, in conjunction with a UE 105. Execution of the various blocks of the flow diagrams of FIGS. 7A and 7B is further shown in FIGS. 8A and 8B.

The exemplary process includes UE 105 executing an application (app A) and mapping the executed app to a S-NSSAI and a Data Network Name (DNN) (block 700), and sending a session establishment request to AMF 150, including the S-NSSAI (block 705). UE 105, during previous UE registration with mobile network 110 (not described herein), may have received one or more S-NSSAIs from the network for use in requesting a UE session. The one or more S-NSSAIs may be initial, or default, S-NSSAIs that can be used for requesting session establishment, but which may be changed to a newly selected S-NSSAI during UE session establishment. Each app installed at UE 105 may map to a particular S-NSSAI and a DNN. The DNN may, for example, be in the form of an Access Point Name (APN). When an app executes, the UE 105 maps the app to a S-NSSAI received during UE registration, and includes the retrieved S-NSSAI in a session request to mobile network 110.

AMF 150, upon receipt of the session establishment request, interrogates the NSSF 155 for a network slice, a slice variation type, and slice variation levels for the UE 105 (block 710), and NSSF 155 returns, to the AMF 150, at least one slice variation type and multiple slice variation levels associated with the NSIs of the network slice (block 715). NSSF 155, when interrogated by the AMF 150, selects a network slice and a slice variation type to serve the requirements of the requesting UE 105 and the particular executing app. NSSF 155 determines the multiple slice instance variations of the selected network slice, with each slice instance variation corresponding to the slice variation type and one of multiple slice variation levels. Each slice instance variation, as described above with respect to FIG. 3 above, is further associated with its own NSI and is assigned a unique NSI ID. Therefore, a network slice having multiple slice instance variations associated with at least one slice variation type, and multiple slice variation levels within each slice variation type, may have multiple NSI IDs for the multiple NSIs within the network slice, with each NSI/NSI ID being associated with a particular slice variation type and a particular slice variation level. NSSF 115 returns an indication of the at least one slice variation type and the multiple slice variation levels associated with the NSIs of the network slice.

AMF 150 sends a S-NSSAI for the network slice, and an indication of the at least one slice variation type and the multiple slice variation levels associated with the multiple NSIs of the network slice, to the UE 105 (block 720) and, upon receipt, the UE 105 selects a slice variation type and one of the multiple slice variation levels and returns an indication of the selection to the AMF 150 (block 725). When UE 105 receives an indication of the at least one slice variation type and the multiple slice variation levels associated with the multiple NSIs of the network slice, UE 105 determines the slice variation type and the slice variation level, among the multiple slice variation levels, that best satisfies the service requirements of the application to be involved in the requested UE session. The UE 105 returns an indication of the selected slice variation type and the selected slice variation level to the AMF 150.

AMF 150 determines an NSI ID, for the UE-selected slice variation type and slice variation level, of an NSI of the multiple NSIs of the network slice (block 730). AMF 150 receives an indication of the selected slice variation type and slice variation level for the UE session from UE 105, and determines an NSI ID of an NSI that is associated with the selected slice variation type and slice variation level. Referring to FIG. 3, if AMF 150 receives an indication of the UE-selection of slice variation type q and slice variation level y, AMF 150 may determine that the NSI ID "NSI_ID qy" is associated with the NSI that serves the particular slice variation type (q) and slice variation level (y) within the network slice.

AMF 150 selects a SMF 145 after querying NRF 170 with the determined S-NSSAI and the determined NSI ID (block 735), and sends a session request, with the S-NSSAI and the NSI ID, to the selected SMF 145 (block 740). NRF 170 may maintain a database that maps S-NSSAIs and NSI IDs to SMFs 145 within mobile network 110. When queried by AMF 150, NRF 170 consults its database, generates a list of SMFs 145 for the S-NSSAI/NSI ID, and returns the SMF list to the requesting AMF 150 for AMF selection of a SMF from the list for use during the UE session.

SWF 145, upon receipt of the session request, checks subscription data, obtains a policy from the PCF 165, and selects a UPF 140 for the UE session (block 745). SMF 145 checks subscription data, obtains a PCF policy, and selects a UPF for the requested session using existing procedures. SMF 145 returns a session accept to the AMF 150 and to the RAN 125 (block 750), and AMF 150, upon receipt of the session accept, returns a session accept to the requesting UE 105 (block 755). The Session Accept may include the S-NSSAI and the NSI ID for the UE session. The UE 105's session may then begin via the network slice and slice instance variation of the mobile network 110 that is associated with the NSI of the network slice having the selected network slice variation type and the selected slice variation level for the session.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 7A and 7B, and sequences of operations, messages, and/or data flows with respect to FIGS. 8A and 8B, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   creating, by one or more network devices in a network, a network slice that satisfies one or more performance characteristics for sessions serviced by the network slice;
   subdividing the network slice into multiple slice instance variations, with each slice instance variation of the multiple slice instance variations having a slice variation type and one of multiple slice variation levels,
   wherein the slice variation type identifies a performance characteristic that varies, at multiple levels of service, within constraints of the one or more performance characteristics of the network slice,
   wherein the performance characteristic of the slice variation type comprises one of load, latency, consistency, reliability, network connectivity, dynamic Service Level Agreements (SLAs), availability, or server locations, and wherein each slice variation level of the multiple slice variation levels identifies a different level of service, from the multiple levels of service, of the performance characteristic that is satisfied by the slice variation level;

allocating, instantiating, and provisioning, by the one or more network devices, virtual resources for each of the multiple slice instance variations multiple NSIs within the network slice; and servicing, by the one or more network devices, User Equipment (UE) sessions via one of the multiple slice instance variations based on UE selection of one of the multiple slice variation levels of the slice variation type.

2. The method of claim 1, wherein the performance characteristic of the slice variation type comprises a load variation type and wherein each of the multiple slice variation levels comprises a different level of load performance.

3. The method of claim 1, wherein the performance characteristic of the slice variation type comprises a latency variation type and wherein each of the multiple slice variation levels comprises a different level of latency performance.

4. The method of claim 1, wherein the performance characteristic of the slice variation type comprises a reliability variation type and wherein each of the multiple slice variation levels comprises a different level of reliability performance.

5. The method of claim 1, wherein the servicing the UE sessions comprises providing service that satisfies the different level of the multiple levels of the performance characteristic, identified by the UE selection of the one of the multiple slice variation levels, within the constraints of the one or more network performance characteristics of the network slice.

6. The method of claim 1, wherein each slice instance variation of the multiple slice instance variations is served by its own Network Slice Instance (NSI) of multiple NSIs.

7. The method of claim 6, further comprising:
assigning a different NSI identifier (ID) of multiple NSI IDs to each of the multiple NSIs.

8. The method of claim 7, wherein servicing the UE sessions comprises:
determining an NSI ID of the multiple NSI IDs based on the UE selection of the one of the multiple slice variation levels of the slice variation type.

9. The method of claim 1, wherein the one or more network devices implement a slice manager and orchestrator and wherein the network comprises a mobile network.

10. One or more network devices, comprising:
at least one communication interface configured to communicate via a network; and
at least one processor configured to:
create a network slice that satisfies one or more performance characteristics for sessions serviced by the network slice,
subdivide the network slice into multiple slice instance variations, with each slice instance variation of the multiple slice instance variations having a slice variation type and one of multiple slice variation levels,
wherein the slice variation type identifies a performance characteristic that varies, at multiple levels of service, within constraints of the one or more performance characteristics of the network slice, wherein the performance characteristic of the slice variation type comprises one of load, latency, consistency, reliability, network connectivity, dynamic Service Level Agreements (SLAs), availability, or server locations, and wherein each slice variation level of the multiple slice variation levels identifies a different level of service, from the multiple levels of service, of the performance characteristic that is satisfied by the slice variation level, allocate, instantiate, and provision virtual resources for each of the multiple slice instance variations within the network slice; and service User Equipment (UE) sessions via one of the multiple slice instance variations based on UE selection of one of the multiple slice variation levels of the slice variation type.

11. The one or more network devices of claim 10, wherein the performance characteristic of the slice variation type comprises one of:
a load variation type, and wherein each of the multiple slice variation levels comprises a different level of load performance,
a latency variation type, wherein each of the multiple slice variation levels comprises a different level of latency performance, or
a reliability variation type, wherein each of the multiple slice variation levels comprises a different level of reliability performance reliability.

12. The one or more network devices of claim 10, wherein each slice instance variation of the multiple slice instance variations is served by its own Network Slice Instance (NSI) of multiple NSIs.

13. The one or more network devices of claim 10, wherein, when servicing the UE sessions, the at least one processor is further configured to:
provide service that satisfies the different level of the multiple levels of the performance characteristic, identified by the UE selection of the one of the multiple slice variation levels, within the constraints of the one or more network performance characteristics of the network slice.

14. The one or more network devices of claim 13, wherein the at least one processor is further configured to:
assign a different NSI identifier (ID) of multiple NSI IDs to each of the multiple NSIs.

15. The one or more network devices of claim 14, wherein, when servicing the UE sessions, the at least one processor is further configured to:
determine an NSI ID of the multiple NSI IDs based on the UE selection of the one of the multiple slice variation levels of the slice variation type.

16. A non-transitory storage medium storing instructions executable by a network device, wherein the instructions comprise instructions to cause the network device to:
create, in a network, a network slice that satisfies one or more performance characteristics of sessions serviced by the network slice,
subdivide the network slice into multiple slice instance variations, with each slice instance variation of the multiple slice instance variations having a slice variation type and one of multiple slice variation levels,
wherein the slice variation type identifies a performance characteristic that varies, at multiple levels of service, within constraints of the one or more performance characteristics of the network slice, wherein the performance characteristic of the slice variation type comprises one of load, latency, consistency, reliability, network connectivity, dynamic Service Level Agreements (SLAs), availability, or server locations, and wherein each slice variation level of the multiple slice variation levels identifies a different level of service, from the multiple levels of service, of the performance characteristic that is satisfied by the slice variation level; and allocate, instantiate, and provision virtual resources for each of the multiple slice instance variations within the network slice to service User Equipment (UE) sessions via one of the multiple slice instance variations based on UE selection of one of the multiple slice variation levels of the slice variation type.

17. The non-transitory storage medium of claim 16, wherein each slice instance variation of the multiple slice instance variations is served by its own Network Slice Instance (NSI) of multiple NSIs.

18. The non-transitory storage medium of claim 16, wherein the instructions to cause the network device to service the UE sessions further comprise instructions to cause the network device to:

provide service that satisfies the different level of the multiple levels of the performance characteristic, identified by the UE selection of the one of the multiple slice variation levels, within the constraints of the one or more network performance characteristics of the network slice.

19. The non-transitory storage medium of claim 18, wherein the instructions further comprise instructions to cause the network device:

assign a different NSI identifier (NSI ID) of multiple NSI IDs to each of the multiple NSIs; and determine an NSI ID of the multiple NSI IDs based on the UE selection of the one of the multiple slice variation levels of the slice variation type.

20. The non-transitory storage medium of claim 16, wherein the performance characteristic of the slice variation type comprises one of:

a load variation type, wherein each of the multiple slice variation levels comprises a different level of load performance, a latency variation type, wherein each of the multiple slice variation levels comprises a different level of latency performance, or a reliability variation type, wherein each of the multiple slice variation levels comprises a different level of reliability performance.

\* \* \* \* \*